(12) United States Patent
Morii

(10) Patent No.: US 7,458,796 B2
(45) Date of Patent: Dec. 2, 2008

(54) MOLD CLAMPING APPARATUS OF INJECTION MOLDING MACHINE AND METHOD OF ADJUSTING EFFECTIVE LENGTH OF TIE BAR

(75) Inventor: Akira Morii, Hiroshima (JP)

(73) Assignee: The Japan Steel Works, Ltd., Tokyo (JP)

( * ) Notice: Subject to any disclaimer, the term of this patent is extended or adjusted under 35 U.S.C. 154(b) by 48 days.

(21) Appl. No.: 11/437,816

(22) Filed: May 22, 2006

(65) Prior Publication Data

US 2006/0286198 A1 Dec. 21, 2006

(30) Foreign Application Priority Data

Jun. 17, 2005 (JP) .......................... P2005-178146

(51) Int. Cl.
*B29C 45/80* (2006.01)
(52) U.S. Cl. .................. 425/141; 264/40.1; 264/40.5; 425/143; 425/150; 425/595
(58) Field of Classification Search ............. 425/143, 425/149, 150, 190, 595, 141, 169, 172; 264/40.5, 264/328.1, 328.9, 328.14, 40.1; 164/4.1, 164/137, 151.4, 154.6, 342, 151.2, 154.2
See application file for complete search history.

(56) References Cited

U.S. PATENT DOCUMENTS 4,345,890 A   8/1982  Hemmi et al.
4,685,876 A * 8/1987  Loscei ........................ 425/150
4,869,659 A * 9/1989  Sakai et al. .................. 425/149
5,059,365 A * 10/1991 Hertzer et al. ............. 264/40.5
5,075,050 A * 12/1991 Nilsson ....................... 264/40.1
5,161,594 A * 11/1992 Bolton et al. ................. 164/4.1
2004/0105911 A1* 6/2004 Kok et al. .................... 425/590

FOREIGN PATENT DOCUMENTS

| JP | 2-75499 A | | 3/1990 |
| JP | 2-147307 | * | 6/1990 |
| JP | 3-26515 A | | 2/1991 |
| JP | 3-38320 A | | 2/1991 |
| JP | 11-240053 A | | 9/1999 |
| JP | 3549280 B2 | | 4/2004 |
| JP | 2005-029495 A | | 2/2005 |

* cited by examiner

*Primary Examiner*—James Mackey
(74) *Attorney, Agent, or Firm*—Sughrue Mion, PLLC

(57) ABSTRACT

A mold clamping apparatus of an injection molding machine, which includes a fixed platen to which a fixed-side mold is attached, a mold clamping housing, a plurality of tie bars provided between the fixed platen and the mold clamping housing and a movable platen to which a moving-side mold is attached and which is capable of moving with respect to the fixed platen along the tie bars. The mold clamping apparatus includes heaters for heating the tie bars and sensors for sensing the temperatures of portions heated by the heaters, and the heaters and the sensors are provided to each of the plurality of tie bars. The mold clamping apparatus includes a temperature adjustor, which is connected to the heaters and the sensors and controls the temperatures of the heated portions of the tie bars.

3 Claims, 5 Drawing Sheets

VARIANCE OF SUBSTRATE THICKNESS: 8.2 μm

VARIANCE OF SUBSTRATE THICKNESS: 3.9 μm

VARIANCE OF SUBSTRATE THICKNESS: 2.0 μm

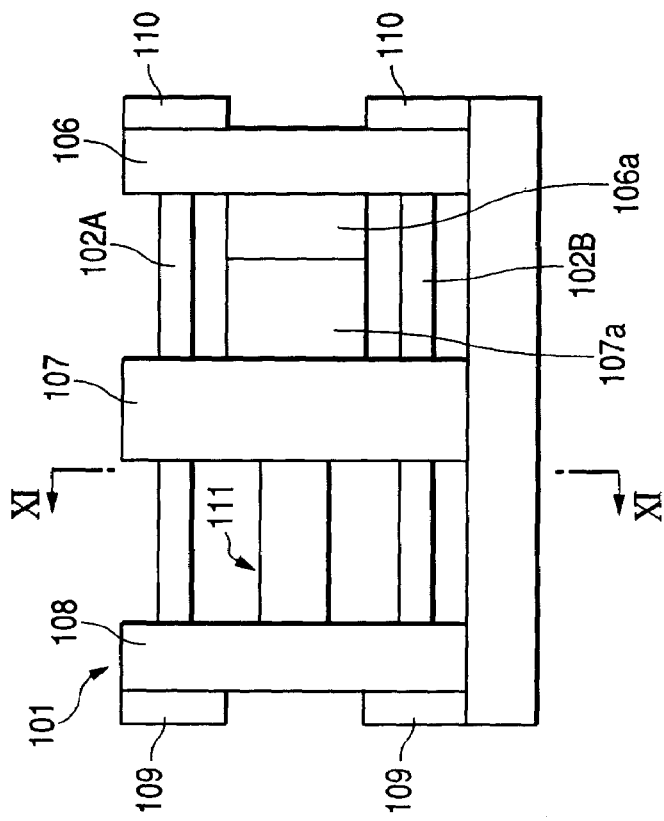

MOLD CLAMPING APPARATUS OF INJECTION MOLDING MACHINE AND METHOD OF ADJUSTING EFFECTIVE LENGTH OF TIE BAR

This application is based on Japanese Patent Application No. 2005-178146, which is incorporated herein by reference.

BACKGROUND OF THE INVENTION

1. Field of the Invention

The present invention relates to a mold clamping apparatus of an injection molding machine and to a method of adjusting effective lengths of tie bars.

2. Description of the Related Art

A mold clamping apparatus shown in FIG. 6 has been known as a mold clamping apparatus provided to an injection molding machine. FIG. 6 is a view schematically showing a related molding clamping apparatus, in which FIG. 6A is a front view thereof, and FIG. 6B is a sectional view taken along a line XI-XI of FIG. 6A.

The mold clamping apparatus 101 shown in FIG. 6 includes a fixed platen 106 to which a fixed-side mold 106a is attached, a movable platen 107 to which a moving-side mold 107a is attached and which is capable of moving with respect to the fixed platen 106, and a mold clamping housing 108 which is connected to the movable platen 107 through a toggle link type or direct hydraulic pressing mechanism 111. Four tie bars 102A to 102D are provided between the fixed platen 106 and the mold clamping housing 108, and the movable platen 107 can move along the tie bars. Male screws are formed at both end portions of each of the tie bars 102A to 102D, tie bar nuts 110 are screwed to the male screws at the side of the fixed platen 106, and female screws formed in mold thickness adjusting units 109 are screwed to the male screws at the side of the mold clamping housing 108. The effective length of each of the tie bars can be adjusted by varying the distance between the tie bar nuts 110 and the mold thickness adjusting units 109.

As the method of changing the effective lengths of the tie bars, a first method of varying the distance between the tie bar nuts 110 and the mold thickness adjusting units 109 by providing die height adjusting nuts to the mold thickness adjusting units 109 and by rotating the die height adjusting nuts has been known. Further, a second method of varying the distance between the tie bar nuts 110 and the mold thickness adjusting units 109 by forming the male screws formed at both end portions of each of the tie bars as screws inversed to each other or by forming pitches thereof different to each other, and by rotating only the tie bars in a state in which the tie bar nuts 110 and the mold thickness adjusting units 109 are fixed has been known. The first method is disclosed in Japanese Patent No. 3549280.

The balance of the extended amount of the four tie bars 102A to 102D when the mold clamping force is generated by operating the mold clamping apparatus 101, and furthermore the balance of the mold clamping force acting on the molds can be adjusted by adjusting individually the effective length of each of the tie bars by the above-described methods.

However, the first method has following problems.

(1) The operation of the injection molding machine needs to be stopped to adjust the effective lengths of the tie bars, and molded products cannot be manufactured during the adjustment.

(2) Since a unit (such as servomotor) for driving each of the die height adjusting nuts is separately required, cost of manufacturing the mold clamping apparatus increases remarkably, whereby it is not practical.

(3) Since the adjustment is rarely completed by performing the adjusting operation only one time, and it is needed to repeat many times the operation and the stoppage of the injection molding apparatus until the adjusting operation is completed, the adjusting operation takes labor and long time.

(4) Since the product molded through a test during the adjustment cannot be shipped as a product and should be discarded, as the adjusting operation is repeated in many times, the amount of wasted material increases.

Furthermore, the second method has following problems.

(1) The operation of the injection molding machine needs to be stopped to adjust the effective lengths of the tie bars, and molded products cannot be manufactured during the adjustment.

(2) Although the tie bar is fixed by any fixing means so that it is not rotated during the normal operation, it is necessary to disassemble the fixing means and to release the fixation during the time of performing the adjusting operation.

(3) The adjustment is rarely completed by performing the adjusting operation only one time, and it is necessary to repeat many times the operation and the stoppage of the injection molding apparatus, and the disassembly and the assembly of the fixing means until the adjusting operation is completed. Therefore, the adjusting operation takes labor and long time.

(4) Since the product molded through a test during the adjustment cannot be shipped as a product and should be discarded, as the adjusting operation is repeated in many times, the amount of wasted material increases.

SUMMARY OF THE INVENTION

Therefore, it is object of the invention to provide a mold clamping unit of an injection molding machine, which is inexpensive and is capable of adjusting the effective lengths of the tie bars in a short time, even in the process of the molding operation, and a method of adjusting the effective lengths of the tie bars.

In order to achieve the above-mentioned object, according to the invention, a mold clamping apparatus of an injection molding machine comprises a fixed platen to which a fixed-side mold is attached, a mold clamping housing, at least one of tie bar provided between the fixed platen and the mold clamping housing, a movable platen to which a moving-side mold is attached and which is capable of moving with respect to the fixed platen along the tie bar, a heater for heating the tie bar, a sensor for sensing a temperature of a portion heated by the heater, the heater and the sensor being provided to each tie bar, and a temperature adjustor which is connected to the heater and the sensor and controls the temperature of the heated portion of the tie bar.

Further, in a method of adjusting effective lengths of tie bars in the mold clamping apparatus of the injection molding machine according to the invention, the tie bar is heated by the heater. Incidentally, the tie bar heated by the heater is adjacent to thin portions of a molded product injected in the mold.

According to the invention, since the temperature of each of the tie bars is individually adjusted, the effective lengths of the tie bars themselves are varied due to the thermal expansion depending on the heated temperature. In this way, the effective length of each of the tie bars is adjusted individually such that the balance of the extended amount of each of the tie bars when the mold clamping force is generated by closing the mold, and furthermore the balance of the mold clamping force acting on the molds can be adjusted. As a result, it is possible to manufacture an excellent molded product of which thickness variance is small.

Therefore, according to the invention, it is possible to adjust the effective lengths of the tie bars by a simple and inexpensive construction of the heaters, the sensors, and the temperature adjustor. Furthermore, it is possible to perform the adjustment of the effective lengths of the tie bars without disassembling the mold clamping apparatus, and furthermore it is possible to perform the adjustment during the time of the molding operation. Accordingly, according to the invention, it is possible to perform the adjustment of the effective lengths of the tie bars in a short time.

As described above, according to the present invention, it is possible to adjust the effective lengths of the tie bars, even in the process of the molding operation.

BRIEF DESCRIPTION OF DRAWINGS

FIGS. 6A and 6B are diagrams schematically showing a related mold clamping apparatus.

DETAILED DESCRIPTION OF THE PREFERRED EMBODIMENTS

An embodiment of the invention will be described with reference to accompanying drawings.

Figure 1:
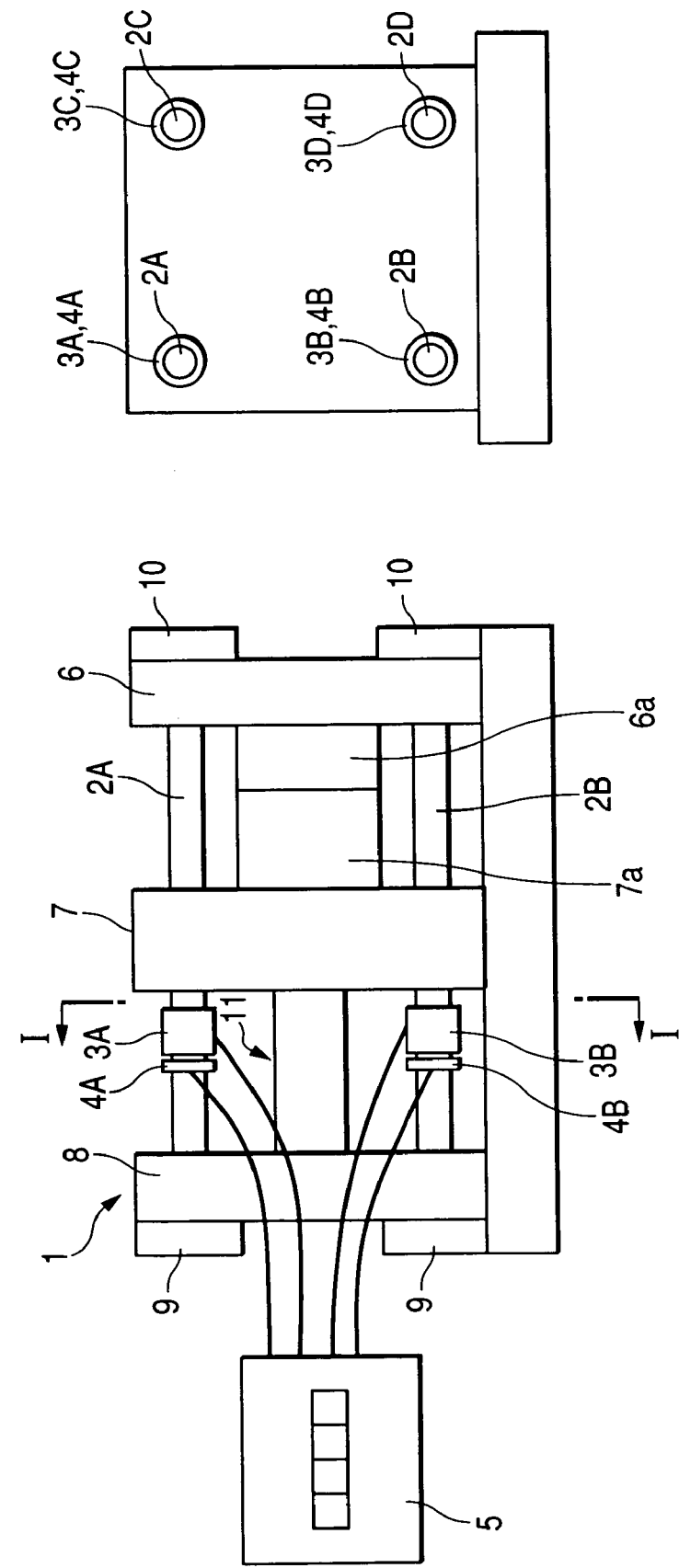
FIGS. 1A and 1B are views schematically showing a mold clamping apparatus according to a first embodiment of the invention.

FIG. 1 is a view schematically showing a mold clamping apparatus according to an embodiment of the invention, in which FIG. 1A is a front view thereof and FIG. 1B is a sectional view taken along a line I-I of FIG. 1A.

The mold clamping apparatus 1 according to a embodiment of the invention includes a fixed platen 6 to which a fixed-side mold 6a is attached, a movable platen 7 to which a moving-side mold 7a is attached and which is capable of moving with respect to the fixed platen 6, and a mold clamping housing 8 which is connected to the movable platen 7 through a toggle link type or direct hydraulic pressing mechanism 11, like the mold clamping apparatus 101 shown in FIG. 6. Four tie bars 2A to 2D are provided between the fixed platen 6 and the mold clamping housing 8, and the movable platen 7 can move along the tie bars. Male screws are formed at both end portions of each of the tie bars 2A to 2D, and tie bar nuts 10 are screwed to the male screws at the side of the fixed platen 6, and female screws formed in mold thickness adjusting units 9 are screwed to the male screws at the side of the mold clamping housing 8.

In the mold clamping apparatus 1 according to the present embodiment, four tie bars 2A to 2D are provided with heaters 3A to 3D for heating predetermined regions of each of the tie bars, and sensors 4A to 4D for sensing the temperatures of regions heated by the heaters 3A to 3D, respectively. The heaters 3A to 3D and sensors 4A to 4D are connected to a temperature adjustor 5, which controls the temperatures of the heated regions of the tie bars. According to the above-described construction, it is possible to adjust individually temperature of the heated region of each of the tie bars. As a result, the effective lengths of the tie bars 2A to 2D themselves are varied due to the thermal expansion depending on the temperature of the heated regions. In this way, the effective length of each of the tie bars is adjusted individually such that the balance of the extended amount of each of the tie bars 2A to 2D when the mold clamping force is generated by closing the mold, and furthermore the balance of the mold clamping force acting on the molds 6a and 7a can be adjusted.

In this way, according to the mold clamping apparatus 1 of the present embodiment, it is possible to adjust the effective lengths of the tie bars 2A to 2D by a simple and inexpensive construction which includes the heaters 3A to 3D, the sensors 4A to 4D, and the temperature adjustor 5. Further, it is possible to perform the adjustment of the effective lengths of the tie bars 2A to 2D without disassembling the mold clamping apparatus 1, and furthermore it is possible to perform the adjustment during the time of the molding operation. Therefore, according to the present embodiment, it is possible to perform the adjustment of the effective lengths of the tie bars in a short time.

Hereinafter, operation of adjusting the effective length will be described specifically with reference to a case in which a DVD is manufactured by the injection molding machine having the mold clamping apparatus 1 of the present embodiment, as an example.

Generally, the effective length adjustment is needed in case that it is desired to reduce the variance of substrate thickness generated when the molds are mounted and the DVD is molded actually, after the test working of the injection molding machine in the factory is finished and is supplied to a user. For example, there has been generated a problem in that the substrate thickness of the DVD molded in the molds 6a and 7a is small at the side of the tie bar 2A, when the molds 6a and 7a are seen from I-I direction of FIG. 1A. In this case, the extended amount of the tie bar 2A at the time of the generation of the mold clamping force is made small, such that the clamping force of the molds 6a and 7a at the portion adjacent to the tie bar 2A is made small, whereby the substrate thickness of the molded product is made large. Therefore, the above-described problem can be removed.

Hereinafter, operation of adjusting the effective length of the tie bar by the above-described method will be described in detail. In the following description, α means a coefficient of linear expansion, H means a length of the tie bar of which temperature is controlled by the heater, T means an initially set temperature of the heater, ΔT means a variation of the set temperature of the heater, and ΔL means an extended amount of the tie bar at the time of the generation of the mold clamping force at the initially set temperature.

(1) The set temperature of the tie bar is increased from T by ΔT.

(2) The tie bar is extended by α·H·ΔT.

(3) The mold clamping force of the tie bar is decreased by α·H·ΔT/ΔL ratio.

(4) Although the substrate thickness of the DVD is not increased in direct proportion to the reduced amount of the mold clamping force, it is varied to be increased as the molding clamping force is reduced.

(5) The above-described processes (1) to (4) are repeatedly performed so that the substrate thickness variance satisfies a reference value, while measuring the substrate thickness of the molded DVD.

Hereinafter, an example in which the theoretical calculation is performed by actually applying numerical values, and which is confirmed through a basic experiment and an application experiment will be described.

(Theoretical Calculation)

Assuming that $\alpha$ is $11 \times 10^{-6}/°$ C., the length H of the thermally adjusted tie bar is 120 mm, and the extended amount $\Delta L$ of the tie bar at the time of the generation of the mold clamping force at the initially set temperature is 0.3 mm (corresponding to 10 t), when the temperature within the temperature adjusting range of the tie bar is increased by 1° C., the extended amount of the effective length of the tie bar due to the thermal expansion thereof is $11 \times 10^{-6} \times 120 \times 1 = 0.00132$ mm.

Therefore, the reduced amount of the mold clamping force is $10 \times 0.00132/0.3 = 0.044$t, and it can be understood that when the temperature of the tie bar is increased by 1° C., the mold clamping force of the tie bar is theoretically decreased by 0.044 t.

(Basic Experiment)

Figure 2:
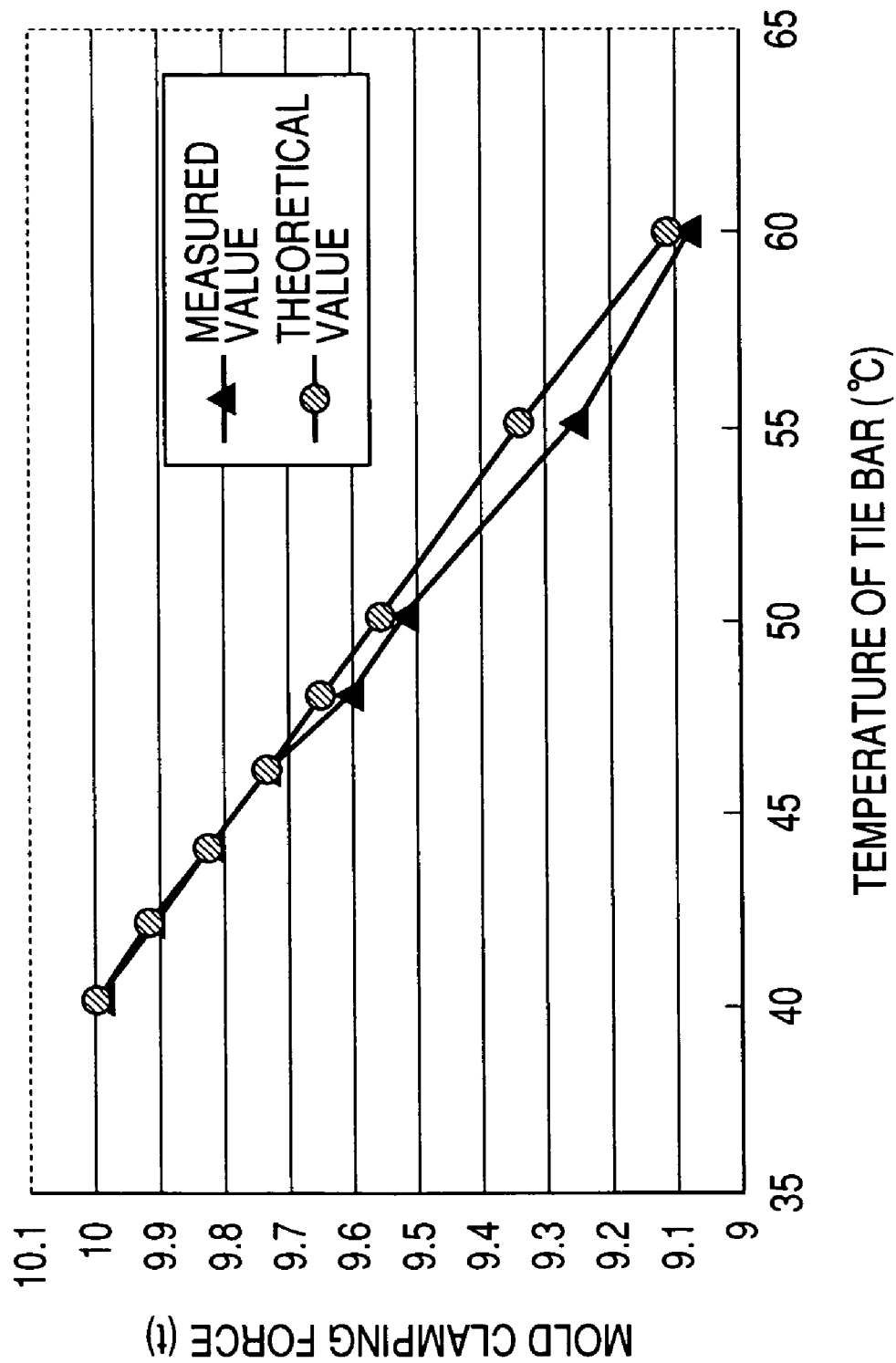
FIG. 2 is a graph showing theoretical values and measured values of a mold clamping force as the temperature of a tie bar is increased.

FIG. 2 shows the theoretical value and measured value in case that the initially set temperature of the four tie bars 2A to 2D is 40° C. and the temperature of only the tie bar 2A is raised. The theoretical value and the measured value are well coincided with each other, and it can be understood that the mold clamping force can be controlled by the temperature control.

(Application Experiment)

Figure 3A:
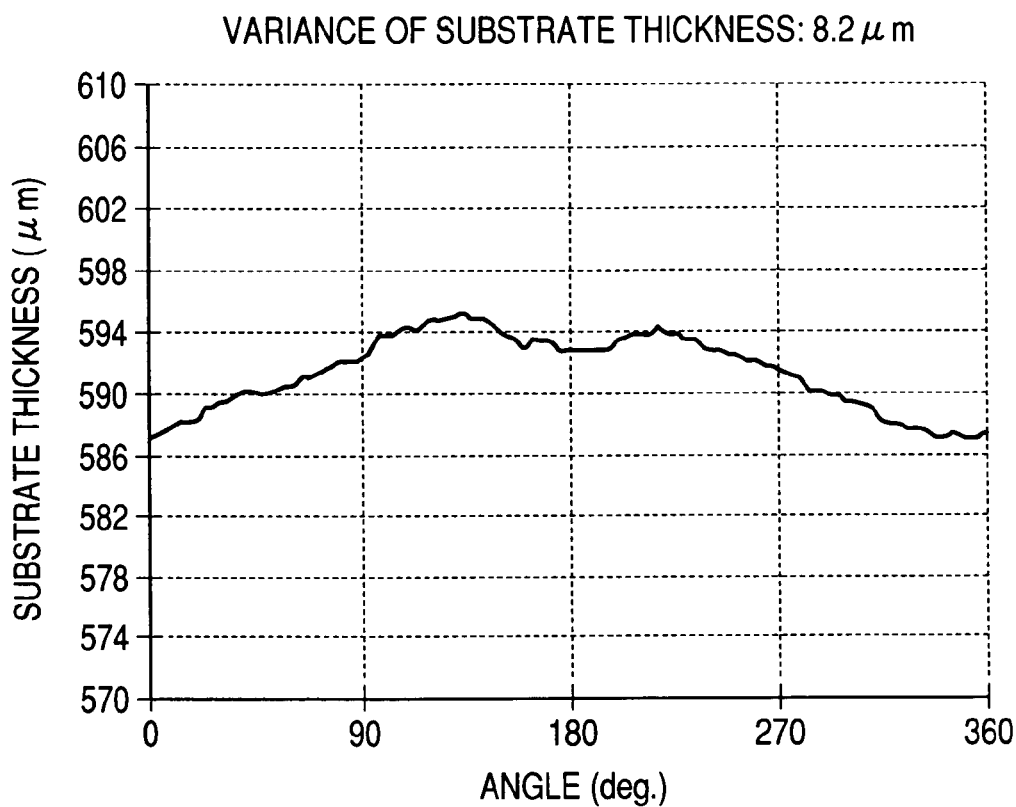
FIGS. 3A and 3B are graphs showing a substrate thickness distribution on the periphery of a DVD (Digital Versatile Disk) at the time of an initial setting.
Figure 3B:
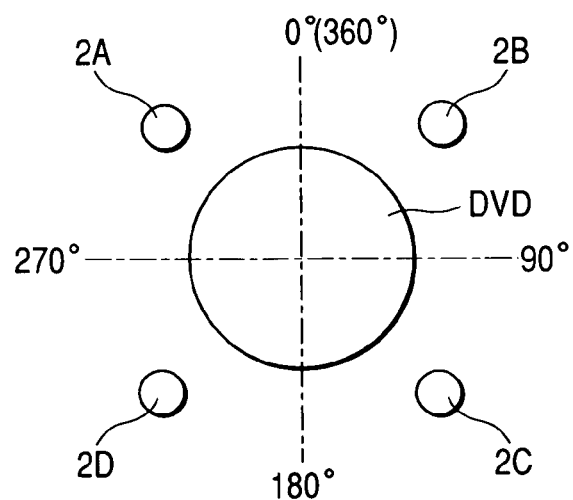

(1) FIG. 3A shows the substrate thickness distribution on the periphery (R=58 mm) of the DVD at the initially set temperature (the initially set temperature of the every tie bar is 40° C.). The variance of the substrate thickness (difference between the maximum and minimum values of the substrate thickness) in the initially set state is 8.2 μm. FIG. 3B is a view schematically illustrating the positional relationship between the DVD molded in the molds 6a and 7a and each of the tie bars 2A to 2D, when the molds 6a and 7a are seen from the I-I direction of FIG. 1A. Furthermore, angles illustrated on the horizontal axis of FIG. 3A correspond to angles illustrated in FIG. 3B.

Figure 4:
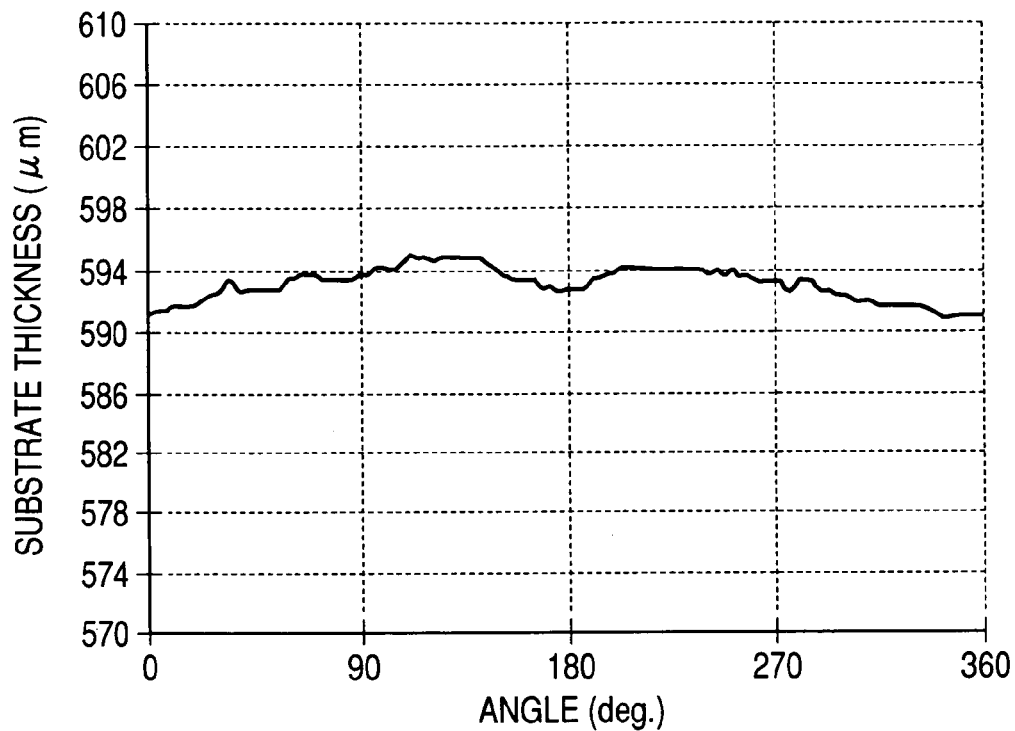
FIG. 4 is a graph showing the substrate thickness distribution on the periphery of the DVD after the temperature of the-upper tie bars is adjusted.

(2) From the result shown in FIG. 3, since it can be understood that the substrate thickness of the DVD becomes thin at the upper side thereof, the temperature of the temperature adjusting range of the upper tie bars 2A and 2B was varied to 45° C. The substrate thickness distribution of the DVD molded-in the above-described state is shown in FIG. 4. As a result, the variance of the substrate thickness is reduced to 3.9 μm.

Figure 5:
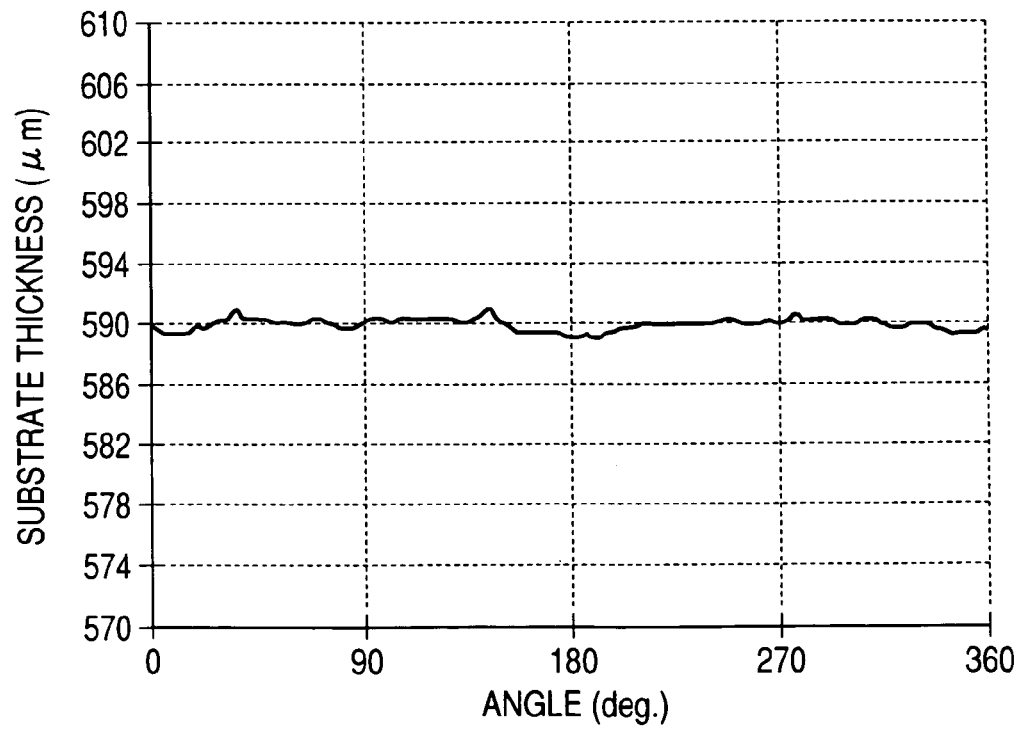
FIG. 5 is a graph showing the substrate thickness distribution on the periphery of the DVD after the temperature of each of the tie bars is adjusted.

(3) In addition, the variation of the set temperature is performed in several times, and finally, the set temperatures of the tie bars 2A, 2B, 2C, and 2D are made into 45° C., 48° C., 39° C., and 40° C., respectively. Therefore, as shown in FIG. 5, it is possible to set the variance of the substrate thickness to 2.0 μm. Until this time, the adjustment time takes about 1 hour.

Such an adjustment takes 4 to 8 hours when it is performed by the related method. However, according to the present embodiment, it can be understood that it is possible to perform the adjustment of the effective length of the tie bar within a significantly short time.

What is claimed is:

1. A mold clamping apparatus of an injection molding machine comprising:
   a fixed platen to which a fixed-side mold is attached;
   a mold clamping housing;
   at least one tie bar provided between the fixed platen and the mold clamping housing;
   a movable platen to which a moving-side mold is attached and which is capable of moving with respect to the fixed platen along the tie bar;
   a heater for heating the tie bar;
   a sensor for sensing a temperature of a portion heated by the heater, the heater and the sensor being provided to each tie bar;
   a measuring device that measures a substrate thickness of a periphery of a product injected and molded in the mold; and
   a temperature adjustor, which is connected to the heater and the sensor and controls the temperature of the heated portion of the tie bar based on the measured substrate thickness.

2. A method of adjusting effective lengths of tie bars in the mold clamping apparatus of the injection molding machine according to claim 1, comprising:
   (a) defining a reference value for a substrate thickness variance of the product to be molded;
   (b) repeatedly heating the tie bar by the heater to different predetermined temperatures;
   (c) measuring the substrate thickness of the molded product after beating the tie bar to each of the predetermined temperatures until the substrate thickness variance of the product reaches the reference value.

3. The method of adjusting effective lengths of tie bars according to claim 2, wherein, when the tie bar is situated adjacent to a thinnest portion of the molded product, the tie bar is heated by the heater to a second heated temperature that is different from a first heated temperature of said tie bar.

* * * * *